(12) United States Patent
Lapujade

(10) Patent No.: US 9,279,562 B2
(45) Date of Patent: Mar. 8, 2016

(54) SYSTEMS AND METHODS FOR ANTI-COLLISION LIGHTS

(71) Applicant: Goodrich Corporation, Charlotte, NC (US)

(72) Inventor: Philippe Lapujade, Chandler, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 70 days.

(21) Appl. No.: 14/218,798

(22) Filed: Mar. 18, 2014

(65) Prior Publication Data

US 2015/0267893 A1 Sep. 24, 2015

(51) Int. Cl.
| F21V 7/00 | (2006.01) |
| B64D 47/06 | (2006.01) |
| F21S 8/10 | (2006.01) |
| F21V 7/04 | (2006.01) |
| F21V 13/04 | (2006.01) |

(52) U.S. Cl.
CPC .............. *F21V 7/0033* (2013.01); *B64D 47/06* (2013.01); *F21S 48/234* (2013.01); *F21V 7/041* (2013.01); *F21V 13/04* (2013.01)

(58) Field of Classification Search
CPC ... F21V 7/0033; F21V 7/0025; F21V 7/0041; F21V 13/04; F21V 7/041; F21V 7/00; F21V 7/10; F21V 7/09; F21V 7/22; B64D 47/06; B64D 2203/00; F21S 48/234
See application file for complete search history.

(56) References Cited

U.S. PATENT DOCUMENTS

| 4,096,555 | A | | 6/1978 | Lasker |
| 5,105,347 | A | * | 4/1992 | Ruud et al. ................... 362/268 |
| 7,029,150 | B2 | * | 4/2006 | Finch ........................... 362/298 |
| 7,755,515 | B2 | * | 7/2010 | Hagan .......................... 340/961 |
| 8,303,139 | B1 | * | 11/2012 | Ohm ............................. 362/298 |
| 9,007,237 | B2 | * | 4/2015 | Jafrancesco et al. .......... 340/985 |
| 2005/0162854 | A1 | | 7/2005 | Finch |
| 2013/0077303 | A1 | * | 3/2013 | Ariyoshi et al. ............. 362/235 |
| 2013/0314256 | A1 | * | 11/2013 | Hessling et al. ............. 340/947 |

FOREIGN PATENT DOCUMENTS

GB 763376 12/1956

OTHER PUBLICATIONS

Extended European Search Report dated Jul. 16, 2015 in European Application No. 15157840.8.

* cited by examiner

*Primary Examiner* — Bao Q Truong

(74) *Attorney, Agent, or Firm* — Snell & Wilmer, LLP

(57) ABSTRACT

Systems and methods are disclosed herein for anti-collision lights. An anti-collision light ("ACL") may include a light source, a primary reflector, and a secondary reflector. The primary reflector may have a concave side facing the light source and the secondary reflector. The secondary reflector may include a reflective cone and a reflective base. The ACL may be configured to efficiently distribute light from the light source according to Federal Aviation Administration ACL requirements.

13 Claims, 5 Drawing Sheets

SYSTEMS AND METHODS FOR ANTI-COLLISION LIGHTS

FIELD

The present disclosure relates generally to aircraft. More particularly, the present disclosure relates to external aircraft lighting systems.

BACKGROUND

Modern aircraft typically comprise an anti-collision light ("ACL") on the exterior of the aircraft. Regulating entities, such as the Federal Aviation Administration, set minimum requirements for the amount and direction of light emitted by the ACL. The ACL may be positioned on the top of an aircraft body, on the bottom of an aircraft body, on the tips of wings, and/or on an aircraft tail in order to decrease the likelihood of collision between aircraft.

SUMMARY

An anti-collision light ("ACL") is disclosed. The ACL may comprise a light source. The ACL may comprise a primary reflector and a secondary reflector. The primary reflector may comprise a concave side facing the light source. The secondary reflector may comprise a reflective cone and a reflective base. The concave side of the primary reflector may face the secondary reflector.

A light system is disclosed. The light system may comprise a light source, a dish-shaped primary reflector, and a secondary reflector. The primary reflector may be configured to collect light from the light source. The secondary reflector may comprise a reflective cone. The primary reflector may be configured to reflect the light form the light source toward the secondary reflector. The secondary reflector may be configured to reflect the light such that the light system outputs at least 400 effective candles (Ecd) from 0 degrees to 5 degrees, at least 240 Ecd from 5 degrees to 10 degrees, at least 80 Ecd from 10 degrees to 20 degrees, at least 40 Ecd from 20 degrees to 30 degrees, and at least 20 Ecd from 30 degrees to 75 degrees.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Systems and method are disclosed herein for a dual-reflector anti-collision light ("ACL"). The dual-reflector ACL may comprise a light source, such as a light emitting diode ("LED"). A first portion of the light emitted from the light source may exit the dual-reflector ACL without significant reflection or lensing. A primary reflector may collect a second portion of the light emitted from the light source and reflect the second portion of the light toward a secondary reflector. The secondary reflector may reflect the second portion of the light away from the dual-reflector ACL in a pattern consistent with Federal Aviation Administration ("FAA") requirements. A third portion of the light emitted from the light source may be directed through a lens of the dual-reflector ACL. The combination of the first portion, second portion, and/or third portion of the light may be configured to meet FAA requirements for ACLs with minimal additional light emitted by the dual-reflector ACL. Thus, the dual-reflector ACL may efficiently use the light emitted by the light source, and the power necessary to drive the light source may be less than for less efficient ACLs. This may allow for lower electricity use, smaller heat sinks, less weight, space, and cost, as well as the ability to use a single light source in an ACL, which may be easier to monitor than an ACL with multiple light sources.

Figure 1:
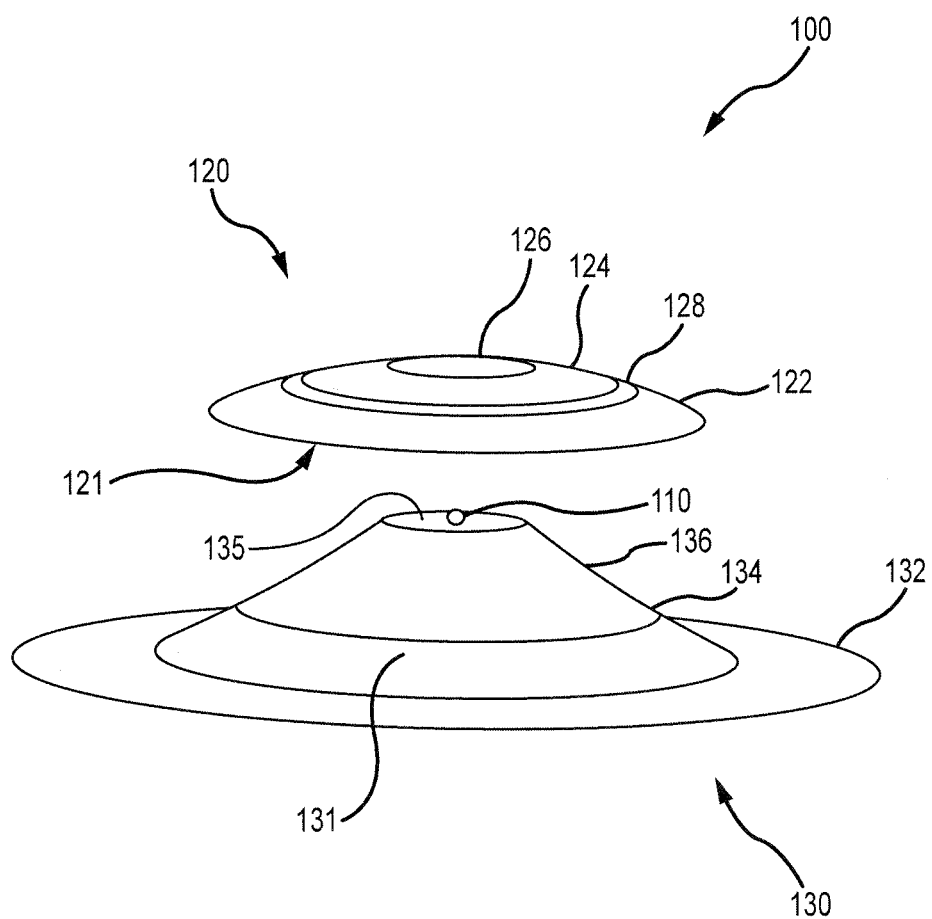
FIG. 1 illustrates an anti-collision light in accordance with various embodiments.

Referring to FIG. 1, a dual-reflector ACL 100 is illustrated according to various embodiments. Dual-reflector ACL 100 may comprise a light source 110, a primary reflector 120, and a secondary reflector 130.

Light source 110 may comprise any device capable of emitting light. In various embodiments, light source 110 may comprise a single light emitting diode ("LED"). In various embodiments, the dual-reflector ACL 100 may reflect light from a single LED sufficiently powerful to meet FAA requirements, unlike some prior ACLs which required multiple light sources. However, in various embodiments, light source 110 may comprise a plurality of LEDs. In various embodiments, light source 110 may emit white and/or red light and/or infrared light. It will be appreciated that the color and/or intensity of light source 110 may be adjusted to meet FAA requirements or other military requirements.

Primary reflector 120 may comprise a dish-shaped reflector, with a concave side 121 of primary reflector 120 facing light source 110 and secondary reflector 130. The concave side 121 may comprise a converging or collimating mirror. In various embodiments, primary reflector 120 may be positioned such that light source 110 is located at a focus of primary reflector 120. In various embodiments, primary reflector 120 may be a parabolic or spherical reflector. However, in various embodiments, the shape of primary reflector 120 may be mathematically calculated in order to reflect light emitted from light source 110 in a desired pattern. In various embodiments, primary reflector 120 may comprise a mirror. In various embodiments, primary reflector 120 may comprise a mirrored coating deposited on a surface of a cover lens.

In various embodiments, primary reflector 120 may comprise an exterior reflective ring 122, an interior reflective ring 124, a central reflector 126, and a lens 128. In various embodiments, central reflector 126 may be located at a vertex of primary reflector 120. Central reflector 126 may be configured to reflect light from light source 110 to reflective base 132 of secondary reflector 130. In various embodiments, interior reflective ring 124 may be adjacent to and circumscribe central reflector 126. In various embodiments, interior reflective ring 124 may reflect light from light source 110 to an upper portion 136 of a reflective cone 131 of secondary reflector 130, wherein upper portion 136 is proximate light source 110. In various embodiments, lens 128 may be adjacent to and circumscribe interior reflective ring 124. In various embodiments, lens 128 may comprise a concave lens, such that light from light source 110 which passes through lens 128 diverges. In various embodiments, exterior reflective ring 122 may be adjacent to and circumscribe lens 128. In various embodiments, exterior reflective ring 122 may reflect light from light source 110 to a lower portion 134 of a reflective cone 131 of secondary reflector 130.

In various embodiments, secondary reflector 130 may comprise a reflective cone 131 and a reflective base 132. In various embodiments, reflective cone 131 may comprise a frustoconical shape. Reflective cone 131 may comprise upper portion 136 proximate light source 110, and lower portion 134 proximate reflective base 132. Light source 110 may be positioned at a top surface 135 of reflective cone 131, wherein top surface is adjacent to upper portion 136 and opposite reflective base 132.

Figure 2:
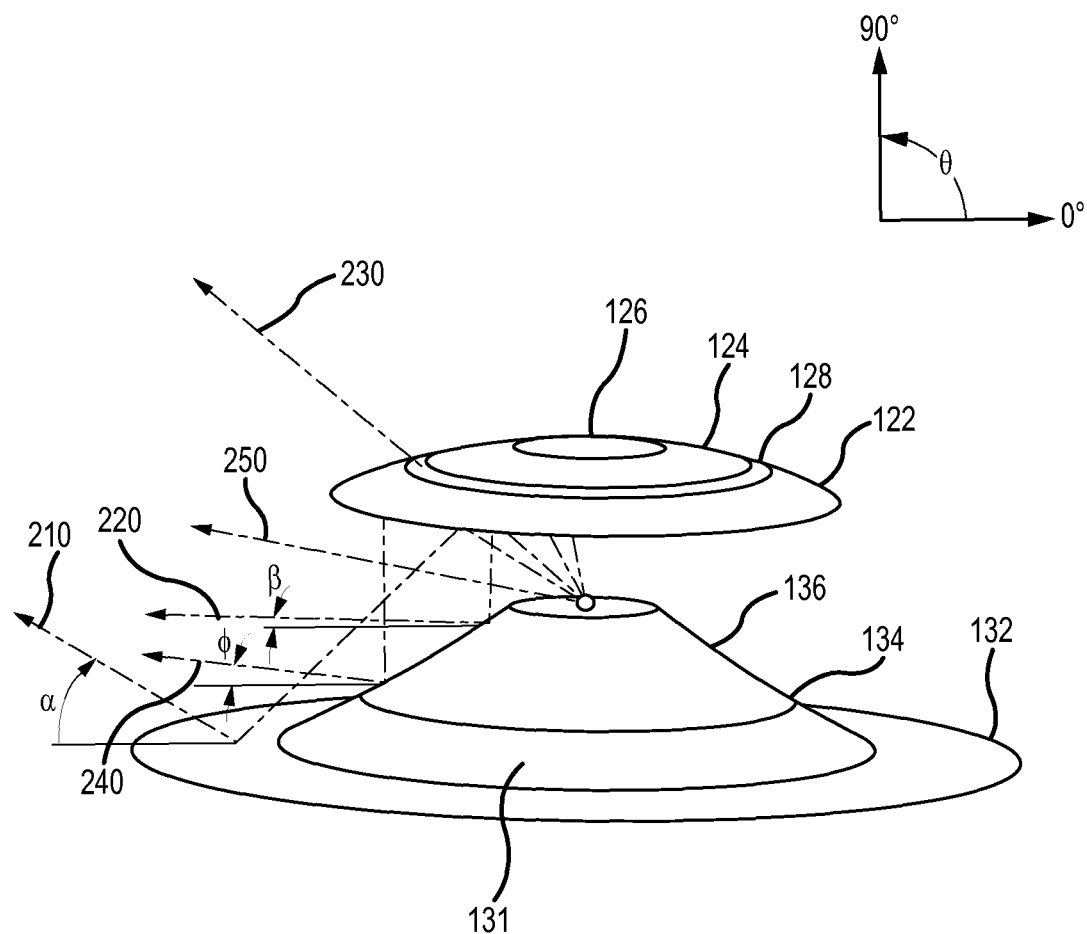
FIG. 2 illustrates a reflection pattern of light rays in an anti-collision light in accordance with various embodiments.

Referring to FIG. 2, a reflection pattern of dual-reflector ACL 100 is illustrated according to various embodiments. Light source 110 may emit light rays between the horizontal plane (0 degrees) and the vertical plane (90 degrees). An axis describing the angular reference is shown for ease of illustration. In various embodiments, dual-reflector ACL 100 may reflect and/or refract the light emitted by light source 110 in order to meet minimum FAA requirements shown in FIG. 5.

In various embodiments, light source 110 may emit first light rays 210 in the direction of central reflector 126. Central reflector 126 may reflect first light rays 210 in the direction of reflective base 132. Reflective base 132 may reflect first light rays 210 between 0 degrees to 30 degrees relative to the horizontal plane.

In various embodiments, light source 110 may emit second light rays 220 in the direction of interior reflective ring 124. Interior reflective ring 124 may reflect second light rays 220 in the direction of upper portion 136 of reflective cone 131. Upper portion 136 may reflect second light rays 220 between 0 degrees and 30 degrees. In various embodiments, upper portion 136 may reflect second light rays 220 primarily between 0 degrees and 5 degrees. As used herein, "primarily" refers to greater than 75% of the luminous flux being reflected within the described range.

In various embodiments, light source 110 may emit third light rays 230 in the direction of lens 128. Lens 128 may refract third light rays 230 between 0 degrees and 90 degrees. In various embodiments, lens may refract third light rays 230 primarily between 30 degrees and 75 degrees.

In various embodiments, light source 110 may emit fourth light rays 240 in the direction of exterior reflective ring 122. Exterior reflective ring 122 may reflect fourth light rays 240 in the direction of lower portion 134 of reflective cone 131. Lower portion 134 may reflect fourth light rays 240 between 0 degrees and 30 degrees. In various embodiments, lower portion 134 may reflect fourth light rays 240 primarily between 5 degrees and 10 degrees.

In various embodiments, light source 110 may emit fifth light rays 250 between 0 degrees and 30 degrees. In various embodiments, primary reflector 120 may be positioned such that primary reflector 120 extends between 30 degrees and 90 degrees. Thus, between 0 degrees and 30 degrees, fifth light rays 250 may be emitted from dual-reflector ACL without reflection or refraction from primary reflector 120 or secondary reflector 130.

As used herein, a "combined angle" refers to a range of angles in which light rays are primarily emitted from dual-reflector ACL 100 after the light rays interact with the components forming the combined angle. For example, central reflector 126 and reflective base 132 may form a combined angle α of 0 degrees to 30 degrees. Similarly, interior reflective ring 124 and upper portion 136 may form a combined angle β of 0 degrees to 10 degrees. Lens 128 may form a combined angle of 30 degrees to 75 degrees. Exterior reflective ring 122 and lower portion 134 may form a combined angle φ of 0 degrees to 10 degrees.

Figure 3:
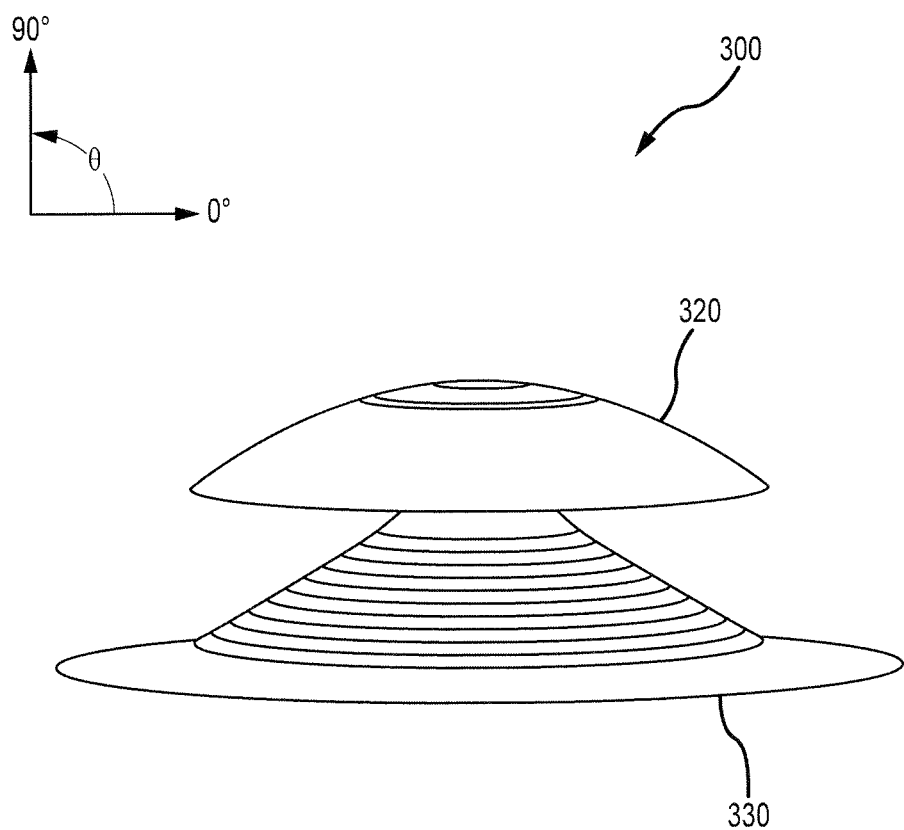
FIG. 3 illustrates an anti-collision light with a 90 degree primary reflector in accordance with various embodiments.

Referring to FIG. 3, a dual-reflector ACL 300 with a 90 degree primary reflector 320 is illustrated according to various embodiments. Similarly to a dual-reflector ACL 100 described in FIG. 1, dual-reflector ACL 300 may comprise a light source, a primary reflector 320, and a secondary reflector 330. However, in dual-reflector ACL 300, primary reflector 320 may be positioned such that primary reflector 320 extends between 0 degrees and 90 degrees. Thus, in various embodiments, the light source does not emit light rays which are in turn emitted from dual-reflector ACL 300 without interacting with at least one of primary reflector 320 and secondary reflector 330.

Figure 4:
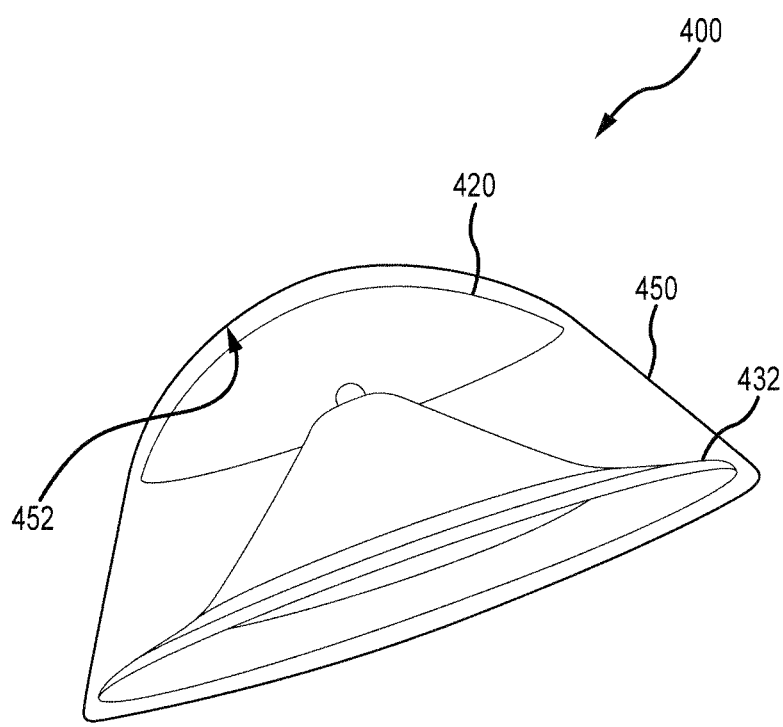
FIG. 4 illustrates an anti-collision light with a cover lens in accordance with various embodiments.

Referring to FIG. 4, a dual reflector ACL 400 with a protective cover lens 450 is illustrated according to various embodiments. In various embodiments, a cover lens 450 may be injection molded. Cover lens 450 may be formed to snap onto or otherwise couple with reflective base 432. Primary reflector 420 may be coated on an inner surface 452 of cover lens 450.

Figure 5:
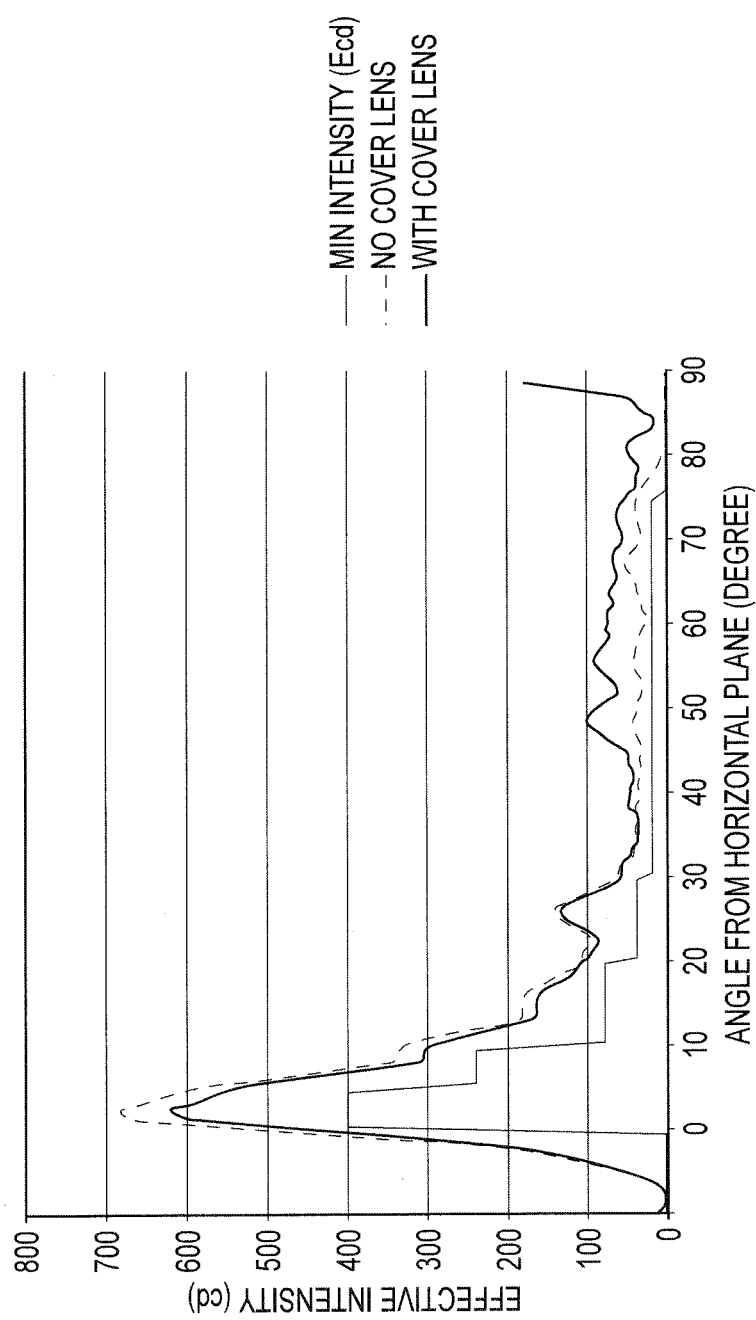
FIG. 5 illustrates a light distribution pattern of an anti-collision light in accordance with various embodiments.

Referring to FIG. 5, a graph illustrating the effective intensity of a dual reflector ACL versus angle from horizontal is illustrated according to various embodiments. As illustrated, by the graph, the minimum intensity required by the FAA is greatest from 0 degrees to 5 degrees, and decreases in steps up to 75 degrees. Two dual-reflector ACLs were simulated, one with a cover lens and one without a cover lens. The light source in each dual-reflector ACL was a 1500 effective lumen LED. As illustrated by the graph, both dual-reflector ACLs output sufficient effective intensity to meet the FAA requirements. For example, from 0 degrees to 5 degrees, the dual-reflector ACLs output over 400 effective candles (Ecd); from 5 degrees to 10 degrees, the dual-reflector ACLs output over 240 Ecd; from 10 degrees to 20 degrees, the dual-reflector ACLs output over 80 Ecd; from 20 degrees to 30 degrees, the dual-reflector ACLs output over 40 Ecd; and from 30 degrees to 75 degrees, the dual-reflector ACLs output over 20 Ecd. In contrast, conventional ACL systems often require light sources of greater than 3000 effective lumen in order to meet the FAA requirements. Thus, the dual-reflector ACLs were shown to more effectively distribute the light from the light sources than conventional ACL systems.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An anti-collision light ("ACL") comprising:
a light source;
a primary reflector comprising a concave side facing the light source, wherein the primary reflector comprises an exterior reflective ring, an interior reflective ring, a central reflector, and a lens; and
a secondary reflector comprising a reflective cone and a reflective base, wherein the concave side of the primary reflector faces the secondary reflector.

2. The ACL of claim 1, wherein the light source is positioned at a focus of the primary reflector.

3. The ACL of claim 1, wherein the light source outputs less than 1500 effective lumens in total.

4. The ACL of claim 3, wherein the ACL outputs at least 400 candela from 0 degrees to 5 degrees relative to a horizontal plane, at least 240 candela from 5 degrees to 10 degrees relative to the horizontal plane, at least 80 candela from 10 degrees to 20 degrees relative to the horizontal plane, at least 40 candela from 20 degrees to 30 degrees relative to the horizontal plane, and at least 20 candela from 30 degrees to 75 degrees relative to the horizontal plane.

5. A light system comprising:
a light source;
a dish-shaped primary reflector configured to collect light from the light source; and
a secondary reflector comprising a reflective cone;
wherein the primary reflector is configured to reflect the light from the light source toward the secondary reflector;
wherein the secondary reflector is configured to reflect the light such that the light system outputs at least 400 effective candles (Ecd) from 0 degrees to 5 degrees relative to a horizontal plane, at least 240 candela from 5 degrees to 10 degrees relative to the horizontal plane, at least 80 candela from 10 degrees to 20 degrees relative to the horizontal plane, at least 40 candela from 20 degrees to 30 degrees relative to the horizontal plane, and at least 20 candela from 30 degrees to 75 degrees relative to the horizontal plane.

6. The light system of claim 5, wherein the primary reflector comprises a central reflector, wherein the central reflector is configured to reflect light rays from the light source to a reflective base of the secondary reflector, and wherein the reflective base is configured to reflect the light rays primarily between 0 degrees and 30 degrees relative to the horizontal plane.

7. The light system of claim 5, wherein the primary reflector comprises an interior reflective ring, wherein the interior reflective ring is configured to reflect light rays from the light source to an upper portion of the reflective cone, and wherein the upper portion of the reflective cone is configured to reflect light rays primarily between 0 degrees and 10 degrees relative to the horizontal plane.

8. The light system of claim 5, wherein the light source outputs less than 1500 effective lumens in total.

9. The light system of claim 5, wherein the primary reflector comprises a lens, and wherein the lens is configured to refract light rays from the light source.

10. The light system of claim 5, wherein the light source is configured to emit light rays between 0 degrees and 30 degrees relative to the horizontal plane which do not interact with the primary reflector or the secondary reflector.

11. An anti-collision light ("ACL") comprising:
a light source;
a primary reflector comprising a concave side facing the light source, wherein the primary reflector comprises a central reflector; and
a secondary reflector comprising a reflective cone and a reflective base, wherein the concave side of the primary reflector faces the secondary reflector, and wherein the central reflector and the reflective base form a combined angle of 0 degrees to 30 degrees.

12. An anti-collision light ("ACL") comprising:
a light source;
a primary reflector comprising a concave side facing the light source, wherein the primary reflector comprises an interior reflector ring; and
a secondary reflector comprising a reflective cone and a reflective base, wherein the concave side of the primary reflector faces the secondary reflector, and wherein the interior reflective ring and upper portion of the reflective cone form a combined angle of 0 degrees to 10 degrees.

13. An anti-collision light ("ACL") comprising:
a light source;
a primary reflector comprising a concave side facing the light source, wherein the primary reflector comprises an interior reflective ring; and
a secondary reflector comprising a reflective cone and a reflective base, wherein the concave side of the primary reflector faces the secondary reflector, and wherein the exterior reflective ring and a lower portion of the reflective cone form a combined angle of 0 degrees to 10 degrees.

\* \* \* \* \*